United States Patent [19]

Fujisawa

[11] Patent Number: 5,245,445

[45] Date of Patent: Sep. 14, 1993

[54] IMAGE PROCESSING APPARATUS

[75] Inventor: Tetsuo Fujisawa, Urawa, Japan

[73] Assignee: Ricoh Company, Ltd., Tokyo, Japan

[21] Appl. No.: 853,431

[22] Filed: Mar. 18, 1992

[30] Foreign Application Priority Data

Mar. 22, 1991 [JP] Japan .................................. 3-58547

[51] Int. Cl.$^5$ .............................................. H04N 1/40
[52] U.S. Cl. .................................. 358/458; 358/462;
358/465; 358/444; 382/54; 382/22
[58] Field of Search ............... 358/458, 462, 465, 466,
358/467, 447, 444, 448; 382/54, 22

[56] References Cited

U.S. PATENT DOCUMENTS 5,001,576 3/1991 Tanaka et al. ...................... 358/447
5,166,810 11/1992 Sorimachi et al. .................. 358/462

FOREIGN PATENT DOCUMENTS

2-84879 3/1990 Japan .

Primary Examiner—Edward L. Coles, Sr.
Assistant Examiner—Fan Lee
Attorney, Agent, or Firm—Mason, Fenwick & Lawrence

[57] ABSTRACT

An image processing apparatus includes an image processing part for carrying out an image processing for an input image having pixels with multilevel bits supplied by an input unit, the image processing being carried out at a processing level among a plurality of predetermined processing levels, a first detecting part for detecting an edge quantity of the input image, a second detecting part for detecting a screened dot quantity of the input image, and a control part for determining a control index proportional to the detected edge quantity and the detected screened dot quantity, and for supplying the determined control index to the image processing part, so that the image processing part selects a processing level appropriate for the input image from the processing levels in response to the control index, and carries out an image processing for the input image at the selected processing level.

8 Claims, 8 Drawing Sheets

|   |   |   |   |   |
|---|---|---|---|---|
| X | X | X | X | X |
| X | 0 | 0 | 0 | X |
| X | 0 | 1 | 0 | X |
| X | 0 | 0 | 0 | X |
| X | X | X | X | X |

|   |   |   |   |   |
|---|---|---|---|---|
| X | X | X | X | X |
| X | 1 | 1 | 1 | X |
| X | 1 | 0 | 1 | X |
| X | 1 | 1 | 1 | X |
| X | X | X | X | X |

|   |   |   |   |   |
|---|---|---|---|---|
| X | X | 0 | X | X |
| X | 0 | X | 0 | X |
| 0 | X | 1 | X | 0 |
| X | 0 | X | 0 | X |
| X | X | 0 | X | X |

|   |   |   |   |   |
|---|---|---|---|---|
| X | X | 1 | X | X |
| X | 1 | X | 1 | X |
| 1 | X | 0 | X | 1 |
| X | 1 | X | 1 | X |
| X | X | 1 | X | X |

| 1 | 1 | 1 |
|---|---|---|
| 1 | 1 | 1 |
| 1 | 1 | 1 |

$\times \frac{1}{9}$  (Fa)

FIG.9B

| 1 | 1 | 1 |
|---|---|---|
| 1 | 2 | 1 |
| 1 | 1 | 1 |

$\times \frac{1}{10}$  (Fb)

FIG.9C

| 1 | 1 | 1 |
|---|---|---|
| 1 | 4 | 1 |
| 1 | 1 | 1 |

$\times \frac{1}{12}$  (Fc)

FIG.9D

| 1 | 1 | 1 |
|---|---|---|
| 1 | 8 | 1 |
| 1 | 1 | 1 |

$\times \frac{1}{16}$  (Fd)

FIG.9E

| 0 | 0 | 0 |
|---|---|---|
| 0 | 1 | 0 |
| 0 | 0 | 0 |

$\times 1$  (Fe)

FIG.9F

| -1 | -1 | -1 |
|----|----|----|
| -1 | 9  | -1 |
| -1 | -1 | -1 |

$\times 1$  (Ff)

FIG.9G

| -1 | -1 | -1 |
|----|----|----|
| -1 | 10 | -1 |
| -1 | -1 | -1 |

$\times \frac{1}{2}$  (Fg)

FIG.9H

| -1 | -1 | -1 |
|----|----|----|
| -1 | 12 | -1 |
| -1 | -1 | -1 |

$\times \frac{1}{4}$  (Fh)

FIG.9I

| -1 | -1 | -1 |
|----|----|----|
| -1 | 16 | -1 |
| -1 | -1 | -1 |

$\times \frac{1}{8}$  (Fi)

FIG.10

IMAGE PROCESSING APPARATUS

BACKGROUND OF THE INVENTION

The present invention relates generally to an image processing apparatus, and more particularly to an apparatus for forming a digital image by carrying out an image processing appropriate for an input image supplied by a scanner, so that the digital image is output by a printer for recording.

In an image processing apparatus, it is desirable to take some measures which allow a high quality digital image to be formed from an input image supplied by a scanner no matter what the characteristics of the input image are. For example, Japanese Laid-Open Patent Application No.2-84879 discloses an image processing apparatus in which an image processing suitable for an input image is selected to output a high quality image. In this apparatus, an input unit for inputting an input image obtained by scanning an original document, an output unit for outputting an image after an image processing is carried out, and a detection unit for detecting characteristics of the input image supplied by the input unit are provided. Based on the characteristics of the input image detected by the detection unit, the kind of the scanned document is discriminated and an image processing suitable for the characteristics of the input image is selected and carried out so that the output unit outputs a high quality image. For example, if it is detected that the document has a character image, an image processing suitable for the character image is selected. If it is detected that the document has a continuous tone image (or a photograph image), an image processing appropriate for the photograph image is selected. And if it is detected that the document has a screened dot image, an image processing suitable for the screened dot image is selected. However, it is required that the above mentioned apparatus define, in advance, the one-to-one correspondence between each of the input image characteristics and each of the image processing procedures suitable therefor. The same requirement is also applicable to filtering processes which are carried out as a kind of image processing. It is also required that the above mentioned apparatus define, in advance, the one-to-one correspondence between each of the input image characteristics and each of the filtering processes.

In order define the one-to-one correspondence mentioned above, all possible combinations of detected image characteristics of an input image must be predetermined. Recently, in an image processing apparatus, it has become desirable and necessary to predict a great number of combinations of detected image characteristics. As the number of the combinations is increasing, realization of such an image processing apparatus in which a desired image processing can be selected for any kind of image characteristics becomes more and more difficult. In the case of the filtering processes, for example, the use of edge intensifying (or edge emphasizing) processes with several low and high levels and smoothing processes with several low and high levels in an image processing apparatus is desirable to reproduce a high quality image. However, it is difficult to predetermine all possible combinations of detected image characteristics to predefine the one-to-one correspondence between each of the image characteristics and each of the filtering processes suitable therefor. Even if it were possible to take the above mentioned measures, it would be difficult to select a suitable filtering process from several processes. In addition, it is necessary to use several filters provided in parallel in an image processing apparatus for switching a filtering process in response to the detected image characteristics so that a suitable filtering process is carried out, and as such an apparatus is bulky, it is not suitable for practical use.

SUMMARY OF THE INVENTION

Accordingly, it is a general object of the present invention to provide an improved image processing apparatus in which the above described problems are eliminated.

Another and more specific object of the present invention is to provide an image processing apparatus which can select an image processing, especially a filtering process, that is appropriate for characteristics of an image image, with no need for predefining the one-to-one correspondence between the image processing and the image characteristics, so that the selected image processing appropriate for the input image is carried out allowing a high quality image to be output. The above mentioned object of the present invention can be achieved by an image processing apparatus which includes an image processing part for carrying out an image processing for an input image having pixels with multilevel bits supplied by an input unit, the image processing being carried out at a processing level from among a plurality of predetermined processing levels, a first detecting part for detecting an edge quantity of the input image supplied by the input unit, a second detecting part for detecting a screened dot quantity of the input image supplied by the input unit, and a control part, coupled to the first and second detecting part, for determining a control index proportional to the detected edge quantity and the detected screened dot quantity, and for supplying the determined control index to the image processing part, so that the image processing part selects a processing level appropriate for the input image from the predetermined processing levels in response to the control index supplied by the control part, and carries out an image processing for the input image at the selected processing level. According to the present invention, it is possible to automatically select an image processing level suitable for the detected image characteristics from plural image processing levels, with no need for predefining the one-to-one correspondence between each of the image processing levels and each of the image characteristics. In particular, in the filtering processes, several levels of edge intensifying (or edge emphasizing) processes suitable for character images and several levels of smoothing processes suitable for photograph images and screened dot images can be set by the fuzzy controller in the image processing apparatus. From such filtering levels, a suitable filtering level is selected based on the control index proportional to the detected quantities of the input image, thus enabling efficient control of the selection of the filtering level in order for reproducing a high quality image.

Other objects and further features of the present invention will become more apparent from the following detailed description when read in conjunction with the accompanying drawings.

DESCRIPTION OF THE PREFERRED EMBODIMENT

First, a description will be given of an embodiment of the present invention by referring to FIGS. 1 and 2. In FIG. 2, an image processing apparatus of the present invention generally has an input unit 1 (for example, a scanner), an image processing unit 2, an output unit 3 (for example, a printer), and a control unit 4. Image processing with respect to an input image having pixels with multilevel bits, supplied by the input unit 1, is carried out by the image processing unit 2, and an image after an image processing is carried out is output by the output unit 2. By the control unit 4, an edge quantity Qe and a screened dot quantity Qs of the input image are detected, and a control index proportional to the detected quantities Qe and Qs is determined. The control index is supplied from the control unit 4 to the image processing unit 2, and an image processing appropriate for the input image is selected by the image processing unit 2 based on the supplied control index.

Figure 1:
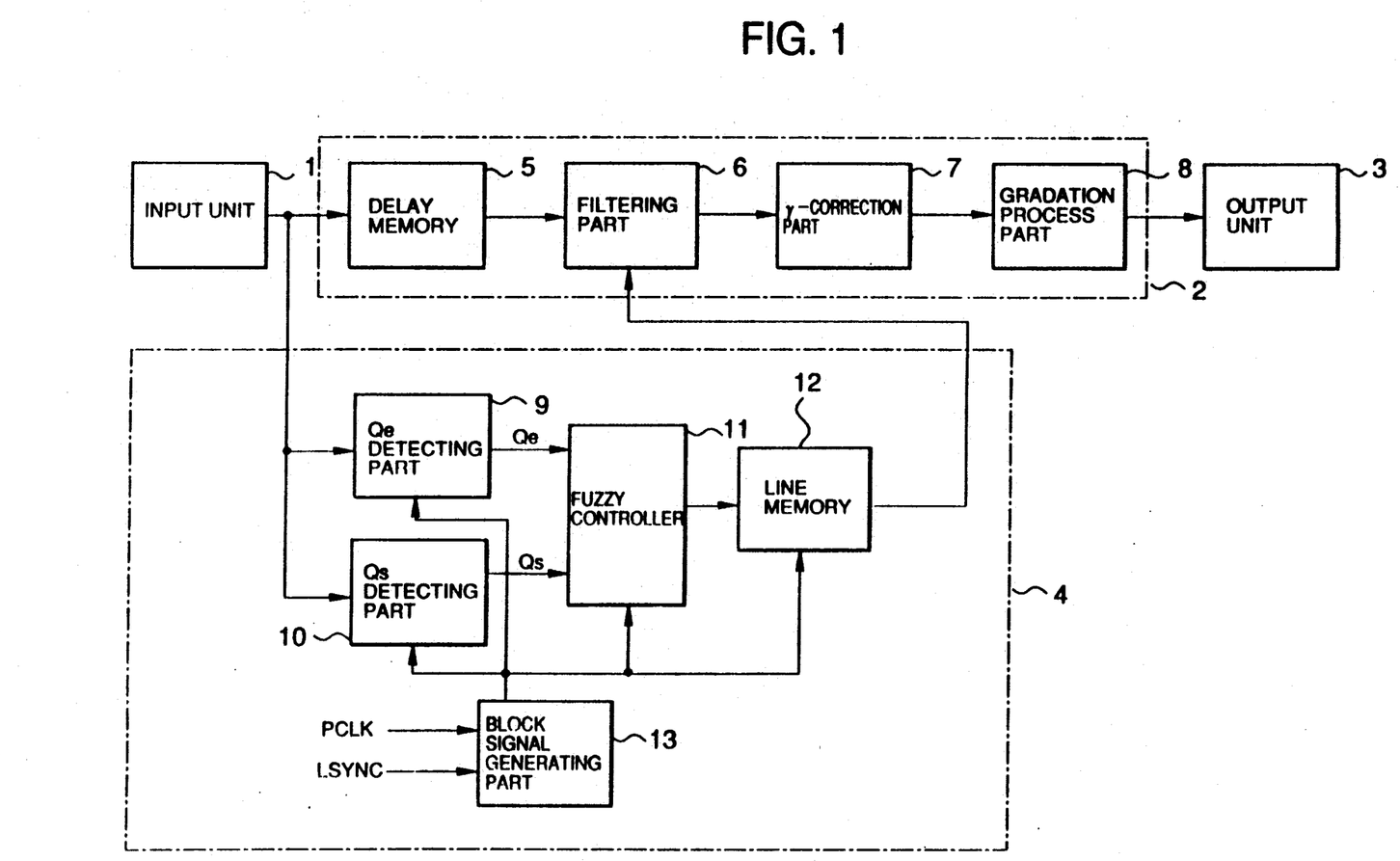
FIG. 1 is a block diagram showing a construction of an image processing apparatus to which the present invention is applied.
Figure 2:
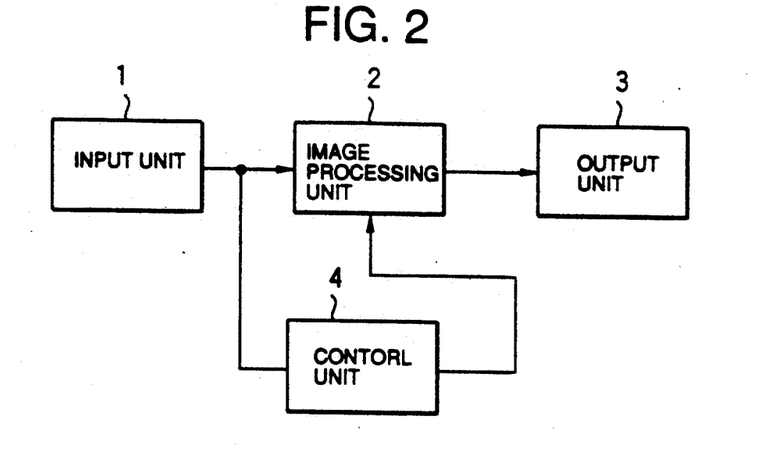
FIG. 2 is a block diagram showing an image processing apparatus according to the present invention.

FIG. 1 shows the construction of the image processing apparatus to which the present invention is applied. In FIG. 1, an input image having pixels with multilevel bits supplied by the input unit 1 is processed by the image processing unit 2, and an image after an image processing is completed is output by the output unit 3 for recording the image. The image processing unit 2 includes a delay memory 5, a filtering part 6, a gamma-correction part 7, and a gradation process part 8, and necessary imaging processes are carried out by each of the parts 6 through 8 with the image data stored in the delay memory 5. The control unit 4 includes a Qe detecting part 9 for detecting an edge quantity (Qe) of the input image supplied by the input unit 1, and a Qs detecting part 10 for detecting a screened dot quantity (Qs) of the input image. The control unit 4 also includes a fuzzy controller 11 and a line memory 12, and operations of the filtering part 6 in the image processing unit 2 are controlled by the fuzzy controller 11 and the line memory 12 in response to the detected quantities Qe and Qs supplied by the detecting parts 9 and 10. The control unit 4 also includes a block signal generating part 13. A main scanning pixel clock PCLK and a sub scanning line sync LSYNC are input to the block generating part 13, and the block generating part 13 outputs block signals in response to the input signals PCLK and LSYNC. The Qe detecting part 9, the Qs detecting part 10, the fuzzy controller 11 and the line memory 12 are operated in synchronism with block signals supplied by the block generating part 13 to the parts of the control unit 4. A main scanning block signal MBLK is periodically supplied by the block generating part 13 at given intervals of pixels, and a sub scanning block signal SBLK is periodically supplied by the block generating part 13 at given intervals of sub scanning lines. For example, if a 3×3 pixel matrix is one block, the block generating part 13 generates a main scanning block signal MBLK periodically at intervals of three pixel clocks PCLK input to the part 13, and generates a sub scanning block signal SBLK periodically at intervals of three line syncs LSYNC input to the part 13.

Figure 3:
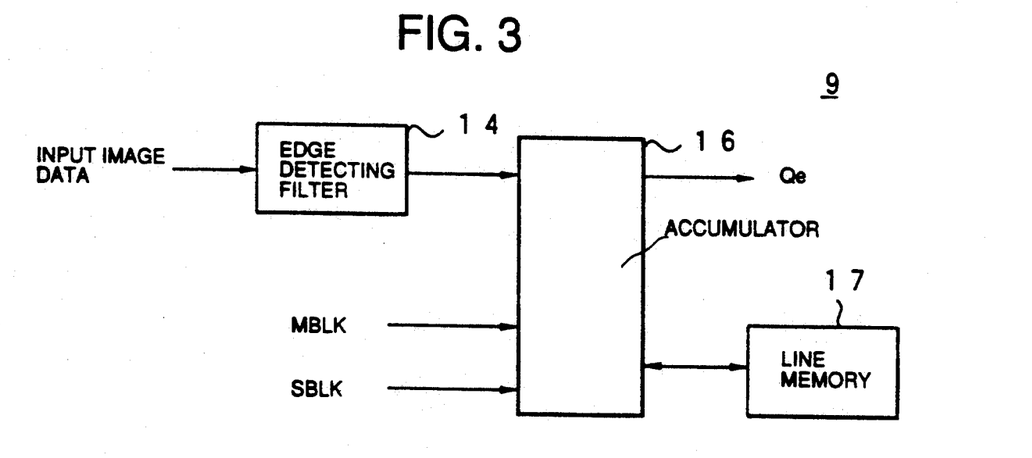
FIG. 3 is a diagram showing an edge quantity detecting part of the apparatus shown in FIG. 1.
Figure 4A:
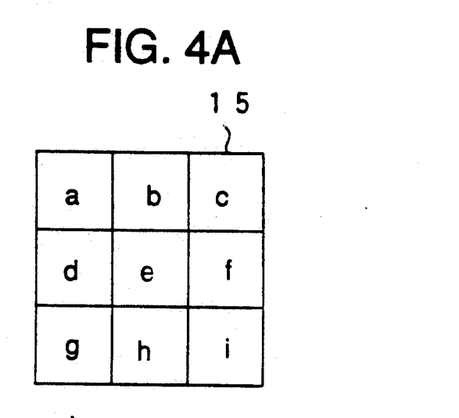
FIGS. 4A and 4B are charts for explaining a filter for detecting an edge quantity of an input image.
Figure 4B:
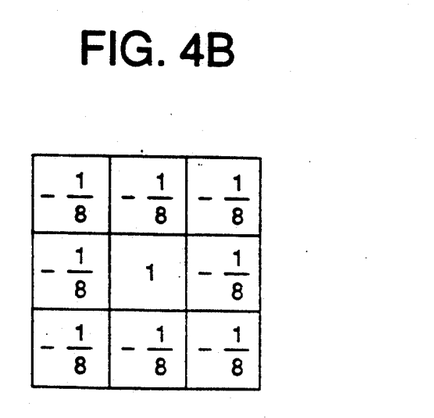

FIG. 3 shows the construction of the edge quantity detecting part 9 in the control unit 4. In FIG. 3, an input image supplied by the input unit 1 is input to an edge detecting filter 14, and an edge quantity Qe of the input image is detected by means of the edge detecting filter 14. FIG. 4A shows a block of a 3×3 dot matrix 15 containing nine pixels "a" through "i", and FIG. 4B shows a filter matrix used in the edge detecting filter 14 for detecting an edge quantity Qe of the input image with respect to each pixel thereof. For example, if the block data of the 3×3 dot matrix shown in FIG. 4A is input to the edge detecting filter 14, an edge quantity Qe(e) with respect to a pixel "e" is detected by means of the filter matrix shown in FIG. 4B as follows.

$$Qe(e) = |8e-a-b-c-d-f-g-h-i|/8 \tag{1}$$

The detected edge quantity Qe for each pixel is supplied to an accumulator 16 so that an edge quantity Qe with respect to a block of the input image is obtained by totaling the edge quantities Qe for all the pixels included in that particular block. If a 3×3 dot matrix is one block, an edge quantity Qe with respect to one block of the input image is obtained as follows.

$$Qe = Qe(a) + Qe(b) + \ldots + Qe(h) + Qe(i) \tag{2}$$

A line memory 17 is a buffer in which intermediate data of the detected edge quantities Qe during process are temporarily stored since plural pixel clocks are successively supplied to the edge detecting part 4 for each main scanning line. For example, if each pixel of the input image has six multilevel bits, the maximum edge quantity of a pixel is equal to 63, and the maximum edge quantity of a 3×3 dot matrix block is equal to 567.

Figure 5:
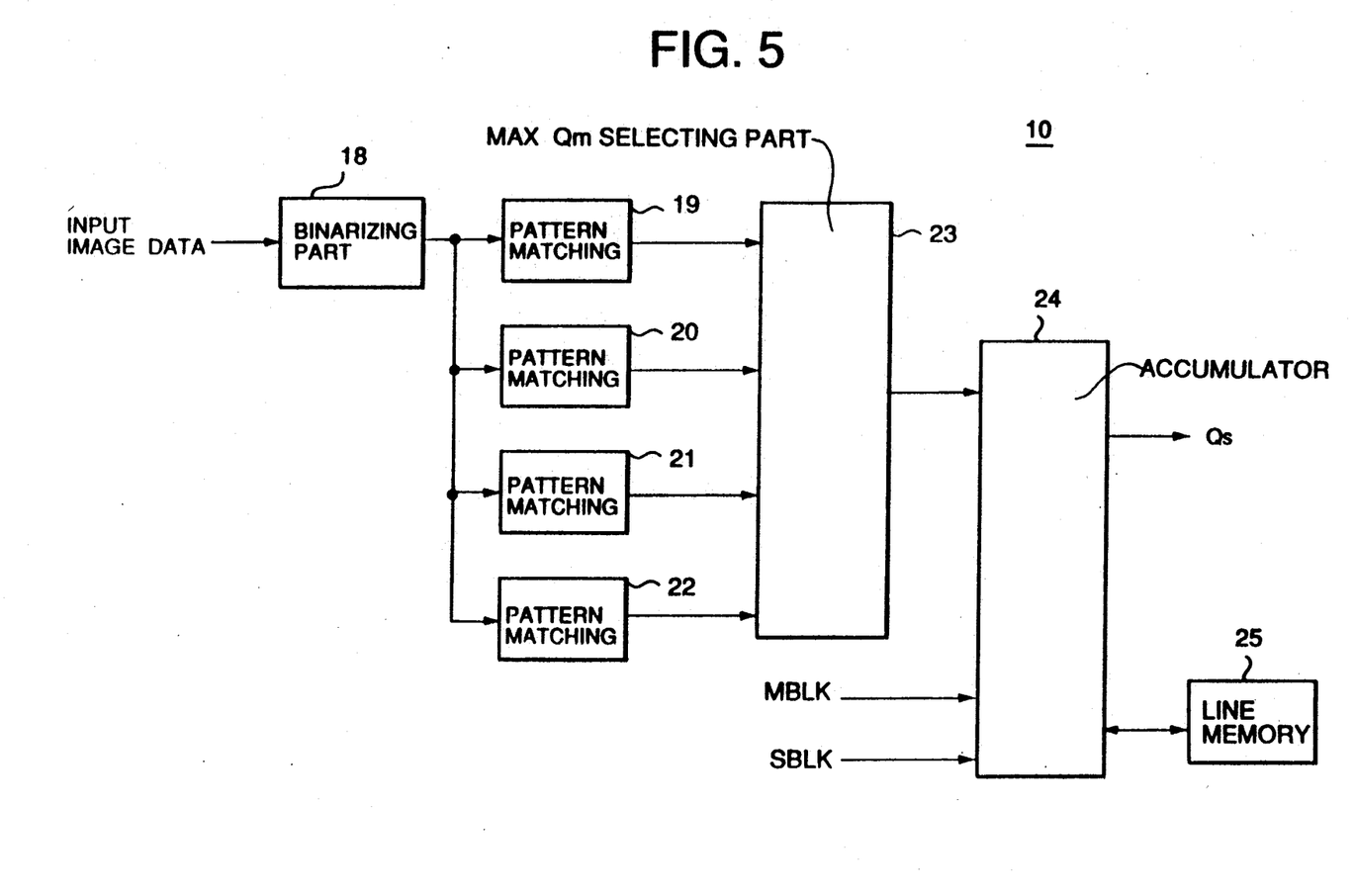
FIG. 5 is a block diagram showing a screened dot quantity detecting part of the apparatus shown in FIG. 1.
Figure 6A:
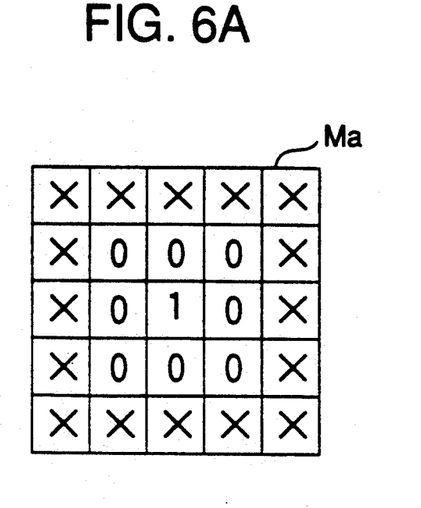
FIGS. 6A through 6D are diagrams showing four dot matrix patterns used in pattern matching circuits of the Qs detecting part of FIG. 5.
Figure 6B:
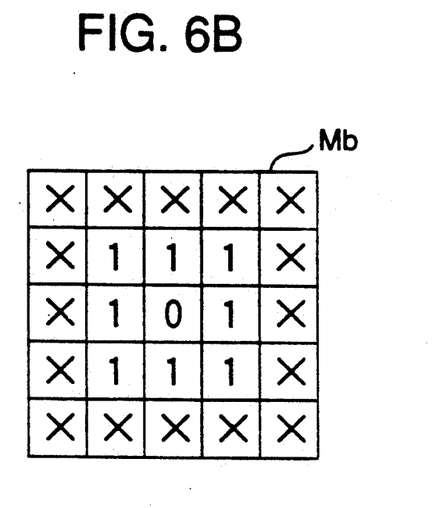
Figure 6C:
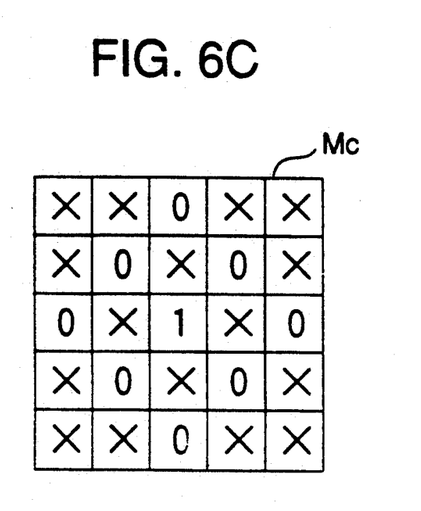
Figure 6D:
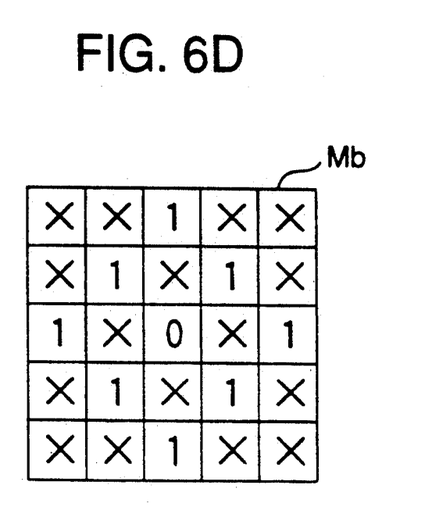

FIG. 5 shows the construction of the screened dot quantity detecting part 10 in the control unit 4. In FIG. 5, an input image with multi-level bits supplied by the input unit 1 is input to a binarizing part 18, and the input image is binarized into binary signals by the binarizing part 18. The binary signals are supplied from the part 18 to each of four pattern matching parts 19 through 22. The pattern matching parts 19 through 22 have predetermined different matrix patterns, and a pattern matching is carried out by each of the pattern matching parts 19 through 22 by comparing the binary signals with the matrix patterns, so that a matching quantity of the input image is detected. FIGS. 6A through 6D show typical 5×5 matrix patterns Ma through Md which are stored in the pattern matching parts 19 through 22, respectively. In FIGS. 6A through 6D, "x" denotes a pixel whose pattern matching is not performed. In each of the pattern matching parts 19 through 22, the binary data of the input image is compared with the corresponding pixel of the stored matching pattern for each pixel of the supplied image so that a matching quantity is detected. This matching quantity is an integer indicating the number of pixels which are matched with those of the matching patterns. If a pixel of the input image does not accord with the center pixel of the matching pattern, the detected matching quantity is always set to zero.

The matching quantities are supplied from the pattern matching parts 19 through 22 to a maximum quantity selecting part 23, and the maximum quantity Qm is selected by the maximum quantity selecting part 23 from the supplied matching quantities. The maximum quantity Qm for each pixel of the input image is supplied to an accumulator 24 coupled to a line memory 25. The operations of the accumulator 24 and the line memory 25 in the Qs detecting part 10 are the same as those of the accumulator 16 and the line memory 17 in the Qe detecting part 9 shown in FIG. 4. That is, in the accumulator 24, a screened dot quantity Qs with respect to each block of the input image is detected by totaling the maximum quantities Qm for all the pixels in that particular block. If a 3×3 dot matrix containing nine pixels is one block of the input image, a screened dot quantity Qs with respect to one block is obtained in, accordance with the formula (2) above by substituting Qs for Qe. The maximum matching quantity Qm of a pixel is equal to 9, and the maximum screened dot quantity Qs of a block of a 3×3 dot matrix is equal to 81.

TABLE 1

| NO. | RULE | FILTER LEVEL |
|---|---|---|
| 1 | Qe low and Qs low | Through (THRU) |
| 2 | Qe medium and Qs low | Edge Intensify LOW (EIL) |
| 3 | Qe high and Qs Low | Edge Intensify HI (EIH) |
| 4 | Qe low and Qs medium | Smoothing LOW (SML) |
| 5 | Qe medium and Qs medium | Through (THRU) |
| 6 | Qe high and Qs medium | Edge Intensify LOW (EIL) |
| 7 | Qe low and Qs high | Smoothing HI (SMH) |
| 8 | Qe medium and Qs high | Smoothing HI (SMH) |
| 9 | Qe high and Qs high | Smoothing LOW (SML) |

Note:
Qe = edge quantity, Qs = screened dot quantity.

The detected quantities Qe and Qs with respect to each block of the input image are supplied to the fuzzy controller 11 from the parts 9 and 10, as shown in FIG. 1. In the fuzzy controller 11, an inference for determining a filter level based on the detected quantities Qe and Qs is performed in accordance with a filter control rule shown in TABLE 1 above. A filter control index corresponding to the determined filter level is supplied by the fuzzy controller 11 to the filtering part 6 via the line memory 12.

Based on the filter control index supplied by the fuzzy controller 11, the filtering part 6 in the image processing unit 2 selects a filtering process appropriate for the input image. The line memory 12 is a buffer in which filter control data supplied by the fuzzy controller 11 for each line including plural pixels is stored, and the operation of the filtering part 6 is controlled for each block of the same line in accordance with the filter control data stored in the line memory 12. The delay memory 5 serves to delay the supplying of the next line of the input image to the filtering part 6 until the control unit 4 supplies filter control data with respect to the preceding line to the image processing unit 2, so that the operating speed of the control unit 4 is in accordance with the supplying speed of the input image to the image processing unit 2.

Figure 7A:
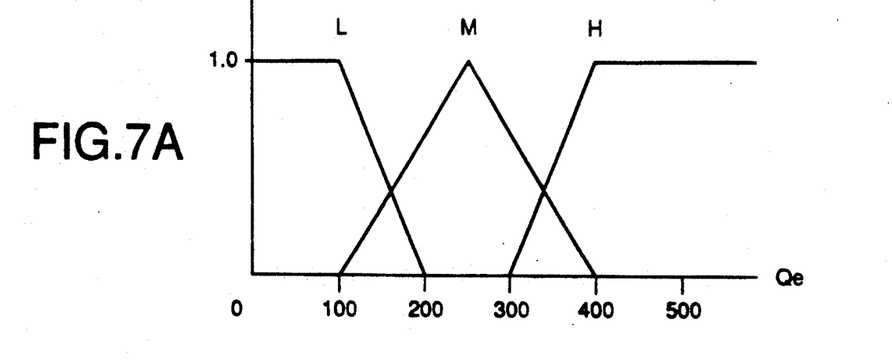
FIGS. 7A through 7C are charts showing membership functions used in a fuzzy controller of the apparatus shown in FIG. 1.
Figure 7B:
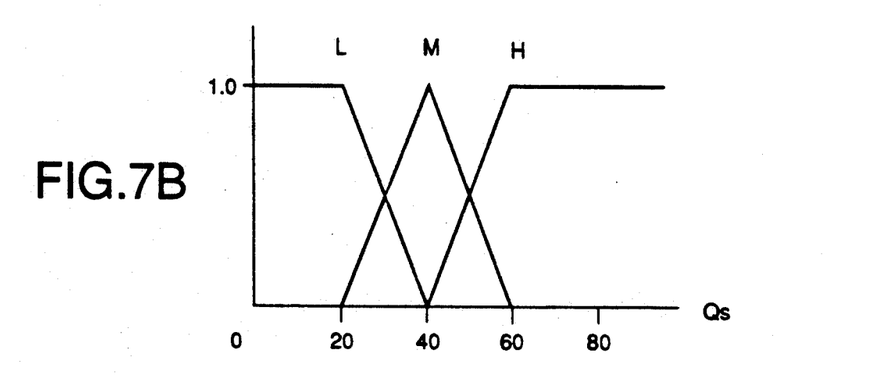
Figure 7C:
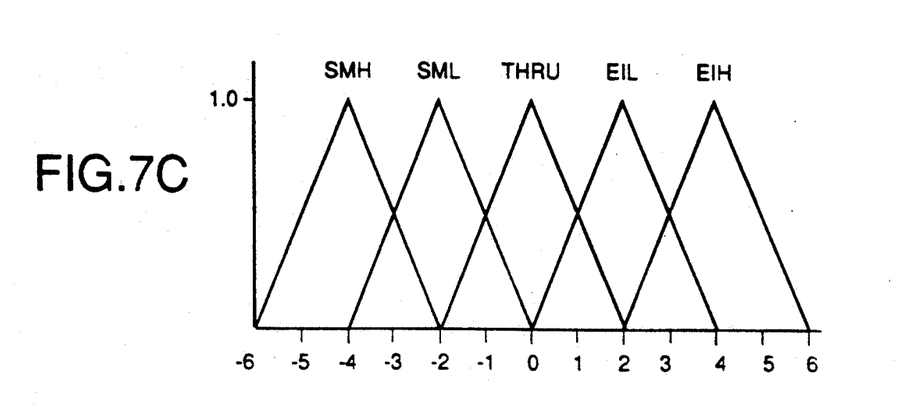

Next, a detailed description will be given of operations performed by the fuzzy controller 11. For the sake of convenience, a case in which the edge quantity Qe=330 and the screened dot quantity Qs=30 are input to the fuzzy controller 11 is considered. A filter control index corresponding to a filter level, which is used for the filtering part 6 to select a filter appropriate for the input image, is determined from the values of the quantities Qe and Qs in accordance with the filter control rule shown in TABLE 1. FIGS. 7A through 7C are charts showing membership functions of the edge quantity Qe, the screened dot quantity Qs and the filter level, and FIGS. 8A through 8D ar charts for explaining processes for determining a filter control index proportional to the detected quantities Qe and Qs.

Figure 8A:
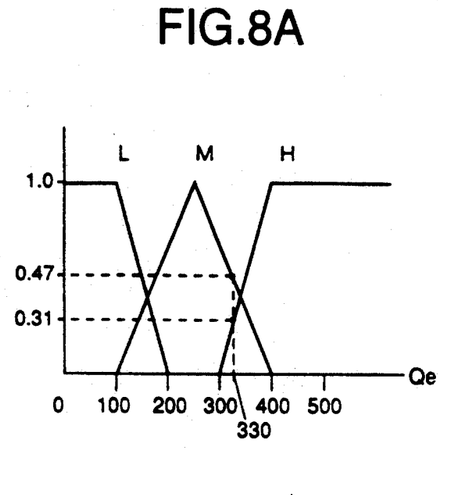
FIGS. 8A through 8D are charts for explaining a filter selecting process performed by the fuzzy controller of FIG. 1.
Figure 8B:
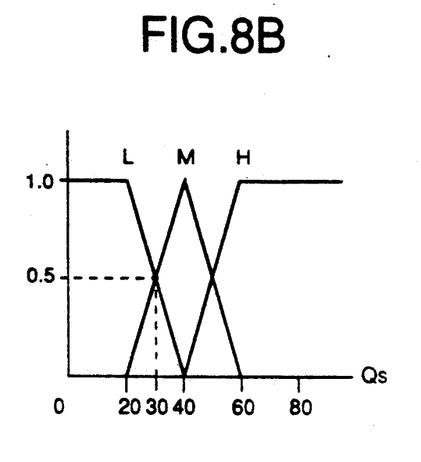
Figure 8C:
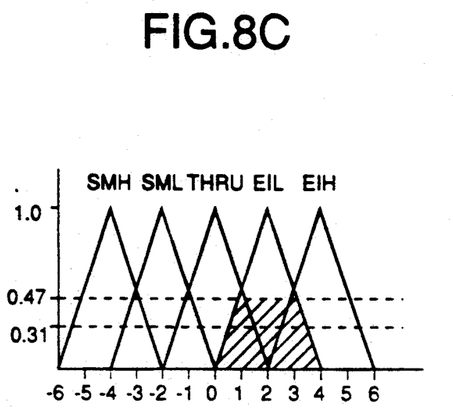
Figure 8D:
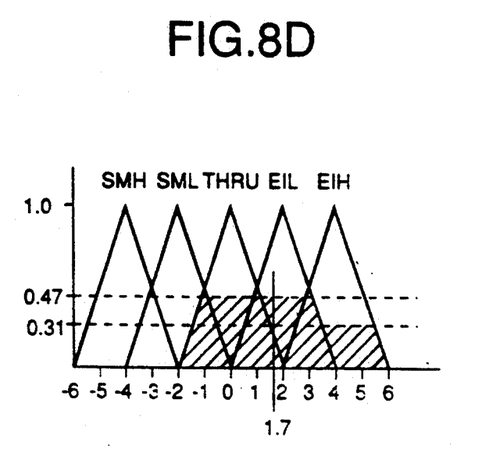
Figure 9A:
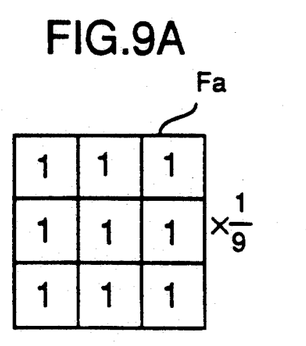
FIGS. 9A through 9I are diagrams showing a number of typical filters provided in a filtering part of the apparatus of FIG. 1.
Figure 9B:
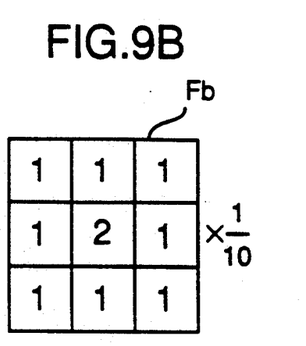
Figure 9C:
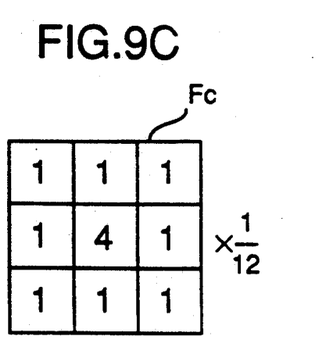
Figure 9D:
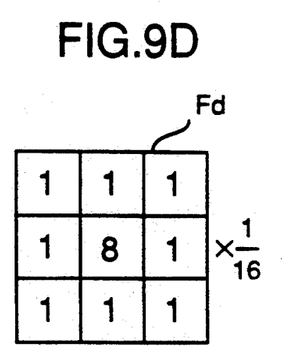
Figure 9E:
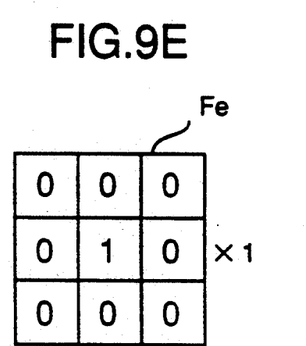
Figure 9F:
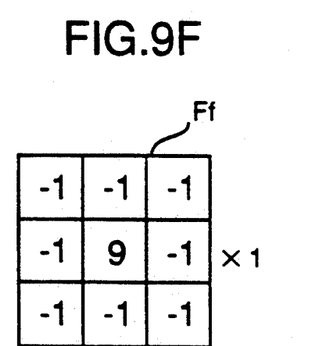
Figure 9G:
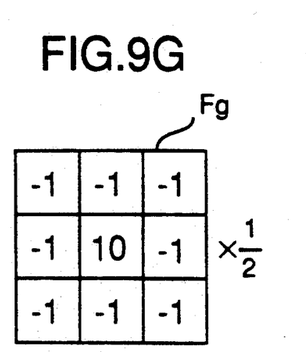
Figure 9H:
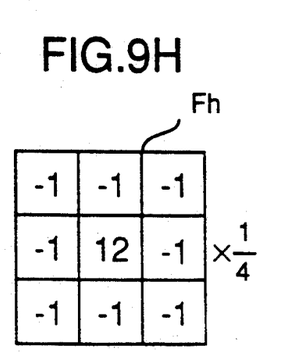
Figure 9I:
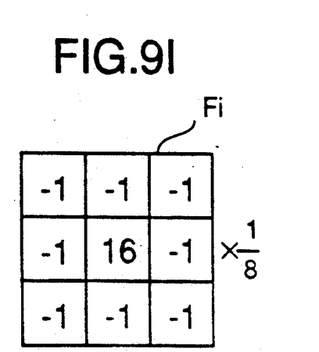

The fuzzy controller 11 first detects points of intersection between the input edge quantity Qe(=330) and the Qe membership functions in the chart shown in FIG. 7A (which functions are predefined based on the filter control index of TABLE 1), so that output values equal to 0.47 and 0.31 corresponding to the detected intersection points are generated. FIG. 8A illustrates this procedure. If there is no point of intersection, the output value is set to zero. Similarly, the fuzzy controller 11 detects points of intersection between the input screened dot quantity Qs(=30) and the Qs membership functions shown in FIG. 7B. These functions are predefined based on the filter control rule of TABLE 1. In this case, an output value equal to 0.5 corresponding to the detected intersection is generated as illustrated in FIG. 8B. Next, the fuzzy controller 11 detects the minimum value of the output values with respect to each filter level by comparing the output values corresponding to the intersection points in the charts of the two membership functions. The results of the above detections make the following TABLE 2.

TABLE 2

| NO. | Fe | Fs | MIN. | FILTER LEVEL |
|---|---|---|---|---|
| 1 | 0 | 0.5 | 0 | Through (THRU) |
| 2 | 0.47 | 0.5 | 0.47 | Edge Intens. LW (EIL) |
| 3 | 0.31 | 0.5 | 0.47 | Edge Intens. HI (EIH) |
| 4 | 0 | 0.5 | 0 | Smoothing LW (SL) |
| 5 | 0.47 | 0.5 | 0.47 | Through (THRU) |
| 6 | 0.31 | 0.5 | 0.31 | Edge Intens. LW (EIL) |
| 7 | 0 | 0 | 0 | Smoothing HI (SH) |
| 8 | 0.47 | 0 | 0 | Smoothing HI (SH) |
| 9 | 0.31 | 0 | 0 | Smoothing LW (SL) |

Note:
Fe = value of Qe membership function for input Qe, Fs = value of Qs membership function for input Qs.

The fuzzy controller 11 calculates a filter control index FCI based on the filter control rule shown in TABLE 1, the minimum values shown in TABLE 2, and a filter-level membership function (FIT) shown in FIG. 7C. In TABLE 2, only the items of NO.2, 3, 5 and 6 are found in which the minimum value is not equal to zero. In this case, the calculations are made with respect to these four items. In the item of NO.2, the minimum value is equal to 0.47 and the filter level is the "Edge Intensify Low (EIL)". Thus, the calculations with respect to the NO.2 item are illustrated by a shading in the chart in FIG. 8C. Similarly, the calculations are made with respect to the remaining items, and they are illustrated by a shading in the chart in FIG. 8D. Finally, the fuzzy controller 11 carries out an anti-fuzzy process so that a filter control index FCI is determined. This anti-fuzzy process is carried out by detecting a "center of gravity" of the shaded area in the chart shown in FIG. 8D. As it is detected that the filter control index FCI is equal to 1.7 corresponding to the detected center of gravity of the shaded area, the fuzzy controller 11 outputs the filter control index FCI equal to 1.7.

Next, a description will be given of a filter selecting process performed by the filtering part 6 in the image processing unit 2 in response to the filter control index supplied by the fuzzy controller 11. FIGS. 9A through 9I show a number of typical filters Fa through Fi provided in the filtering part 6. The filters Fa through Fd are smoothing filters used for a smoothing process, and the filter Fa has the highest smoothing level and the filter Fd has the lowest smoothing level. The filter Fe is a "through" filter by which neither a smoothing nor an edge intensifying is performed. The filters Ff through Fi are edge intensifying filters used for an edge intensifying process, the filter Fi having the highest intensifying level and the filter Ff having the lowest intensifying level. From these nine filters, the filtering part 6 selects a suitable filter in response to the filter control index supplied by the fuzzy controller 11. The following TABLE 3 illustrates several control indexes corresponding to the above mentioned filters. In the filter selecting process, the supplied filter control index is rounded off to the nearest integer. In the present case, the supplied index equal to 1.7 is rounded off to 2, and the filter Fg corresponding to 2 is selected by the filtering part 6.

TABLE 3

| FCI | FID | CPF | DC | SC |
|-----|-----|-----|------|-------------------|
| −4  | Fa  | 1   | 1/9  | Smoothing (SM)    |
| −3  | Fb  | 2   | 1/10 | Smoothing (SM)    |
| −2  | Fc  | 4   | 1/12 | Smoothing (SM)    |
| −1  | Fd  | 8   | 1/16 | Smoothing (SM)    |
| 0   | Fe  | —   | —    | Through (THRU)    |
| 1   | Ff  | 9   | 1    | Edge Intensify (EI) |
| 2   | Fg  | 10  | 1    | Edge Intensify (EI) |
| 3   | Fh  | 12  | 1    | Edge Intensify (EI) |
| 4   | Fi  | 16  | 1    | Edge Intensify (EI) |

Note:
FCI = filter control level, FID = filter id, CPF = center pixel factor, DC = division coefficient of the filter, SC = selector control.

Figure 10:
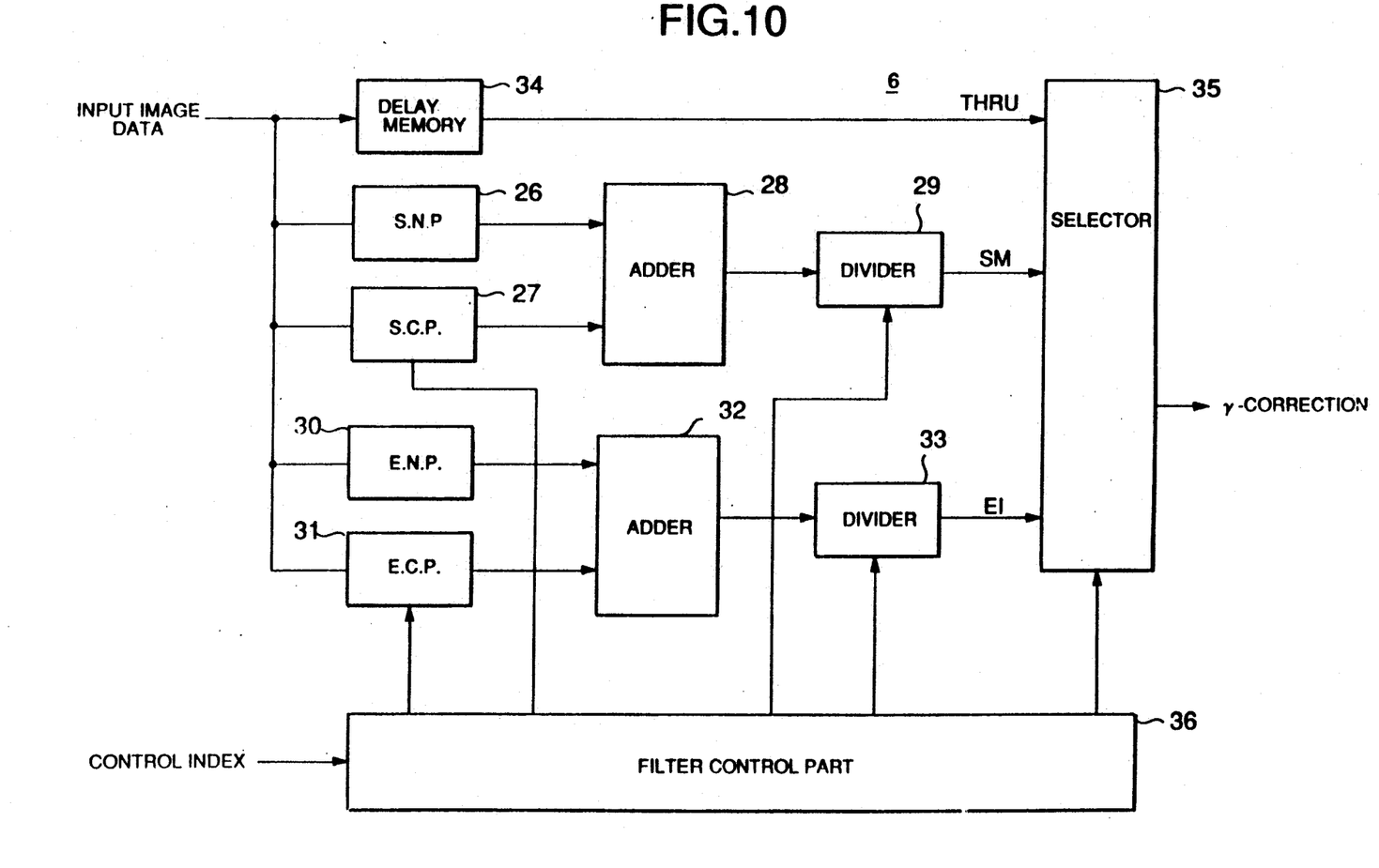
FIG. 10 is a block diagram showing a construction of the filtering part of the apparatus of FIG. 1.

FIG. 10 shows the construction of the filtering part 6 in the image processing unit 2. The filtering part 6 has a smoothing section for carrying out a smoothing process for the supplied input image by means of a smoothing filter, an edge intensifying section for carrying out an edge intensifying process for the input image by means of an edge intensifying filter, and a through process section where the input image passes through with no filtering process is carried out. In FIG. 10, the smoothing section of the filtering part 6 includes a smoothing neighborhood pixel (SNP) operations module 26, a smoothing center pixel (SCP) operations module 27, an adder 28, and a divider 29.

It should be noted that filtering operations, including smoothing operations and edge intensifying operations, performed by the filtering part 6 are divided into two categories, one being neighborhood pixel filtering with respect to neighborhood pixels of a block of the input image (e.g., eight pixels surrounding the center pixel of a 3×3 dot matrix block) and the other being center pixel filtering with respect to the center pixel of a block of the input image. The SNP operations module 26 performs the neighborhood pixel filtering operations by multiplying neighborhood pixels of each block of the input image by filter factors of the given matrix pattern of the selected filter, and the resulting products are added together by the adder 28. The sum of the products is divided by the given division coefficient by means of the divider 29. The SCP operations module 27 performs the center pixel filtering operations by multiplying the center pixel of each block of the input image by the center filter factor of the given matrix pattern of the selected filter. The resulting products are added together by means of the adder 28, and the sum of the products is divided by the given division coefficient by means of the divider 29. The smoothing section thus supplies an image after such a filtering is carried out to a selector 35.

The edge intensifying section includes an edge intensifying neighborhood pixel (ENP) operations module 30, an edge intensifying center pixel (ECP) operations module 31, an adder 32, and a divider 33. Similarly to those discussed above, the ENP operations module 30 performs neighborhood pixel edge intensifying operations and the ECP operations module 31 performs center pixel edge intensifying operations, by means of the adder 32 and the divider 33. The edge intensifying section thus supplies an image after such a filtering is carried out to the selector 35. The through process section includes a delay memory 34 serving to delay the supplying of the input image to the selector 35 for harmonizing the image output speed with that of the other sections into the selector 35.

The selector 35 selects one of the three images supplied by the through process section, the smoothing section and the edge intensifying section, and the selected image is supplied to the gamma-correction part 7. Based on the filter control index supplied by the control unit 4, a filter control part 36 detects the center pixel factor of the SCP operations module 27, the center pixel factor of the ECP operations module 31, the division coefficient of the divider 29 and the division coefficient of the divider 33, and the part 36 controls operations of the selector 35 when the filtered image after a suitable filtering process is carried out is selected.

Further, the present invention is not limited to the above described embodiment, and variations and modifications may be made without departing from the scope of the present invention.

What is claimed is:

1. An image processing apparatus comprising:
   image processing means for carrying out an image processing for an input image having pixels with multilevel bits supplied by an input unit, said image processing being carried out at a processing level from among a plurality of predetermined processing levels;
   first detecting means for detecting an edge quantity of the input image supplied by the input unit;
   second detecting means for detecting a screened dot quantity of the input image supplied by the input unit; and
   control means, coupled to the first and second detecting means, for determining a control index proportional to the detected edge quantity and the detected screened dot quantity, and for supplying the determined control index to said image processing means, so that said image processing means selects a processing level appropriate for the input image from said predetermined processing levels in response to the control index supplied by said control means, and carries out an image processing for the input image at the selected processing level.

2. An apparatus according to claim 1, wherein said control means determines said control index based on a predetermined characteristic relationship between the edge quantity and the processing level, based on a predetermined characteristic relationship between the screened dot quantity and the processing level, and based on a predetermined characteristic relationship between the control index and the processing level.

3. An apparatus according to claim 1, wherein said control means determines said control index based on a first membership function defining a predetermined characteristic relationship between the edge quantity and the processing level, based on a second membership function defining a predetermined characteristic relationship between the screened dot quantity and the processing level, and based on a third membership function defining a predetermined characteristic relationship between the control index and the processing level, whereby said control index is determined by detecting a center of gravity of an area in a diagram described by said third membership function whose processing level is appropriate for both the detected edge quantity and the detected screened dot quantity.

4. An apparatus according to claim 1, wherein said image processing means carries out a filtering process for the input image at a filtering level from among a plurality of predetermined filtering levels by selecting a filtering level appropriate for the input image from said predetermined filtering levels in response to the control index supplied by said control means.

5. An apparatus according to claim 4, wherein said control means determines said control index based on a predetermined characteristic relationship between the edge quantity and the filtering level, based on a predetermined characteristic relationship between the screened dot quantity and the filtering level, and based on a predetermined characteristic relationship between the control index and the filtering level.

6. An apparatus according to claim 4, wherein said control means determines said control index based on a first membership function defining a predetermined characteristic relationship between the edge quantity and the filtering level, based on a second membership function defining a predetermined characteristic relationship between the screened dot quantity and the filtering level, and based on a third membership function defining a predetermined characteristic relationship between the control index and the filtering level, whereby said control index is determined by detecting a center of gravity of an area in a diagram described by said third membership function whose filtering level is satisfied by both the detected edge quantity and the detected screened dot quantity.

7. An apparatus according to claim 4, wherein said image processing means carries out said filtering process, which process is divided into two kinds of operations, center pixel filtering operations performed with respect to a center pixel of a filter matrix and neighboring pixel filtering operations performed with respect to neighboring pixels surrounding the center pixel of the filter matrix.

8. An apparatus according to claim 4, wherein said image processing means includes smoothing process modules for carrying out center pixel filtering operations and for carrying out neighboring pixel filtering operations, which two kinds of operations are controlled independently of each other in response to the control index supplied by said control means, and said image processing means includes edge intensifying process modules for carrying out center pixel filtering operations and for carrying out neighboring pixel filtering operations, which two kinds of operations are also controlled independently of each other in response to the control index supplied by said control means.

* * * * *